Nov. 7, 1967   H. W. KEIL   3,351,281
UNITARY STEAM TRAP RIG
Filed Aug. 2, 1965   2 Sheets-Sheet 1
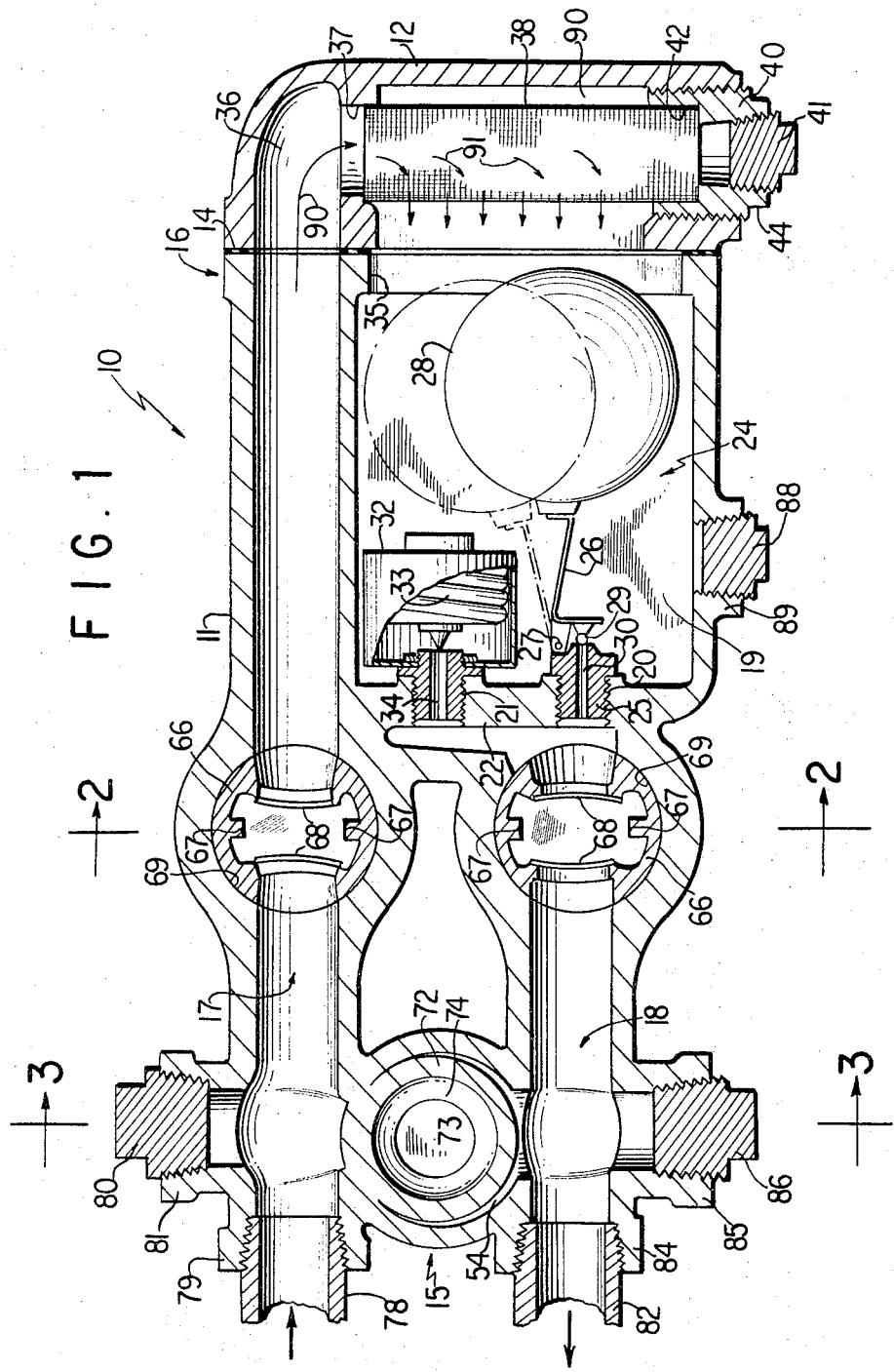
INVENTOR
HOWARD W. KEIL
BY
Robertson, Smythe, Bryan & Parmelee
ATTORNEYS Nov. 7, 1967   H. W. KEIL   3,351,281
UNITARY STEAM TRAP RIG
Filed Aug. 2, 1965   2 Sheets-Sheet 2
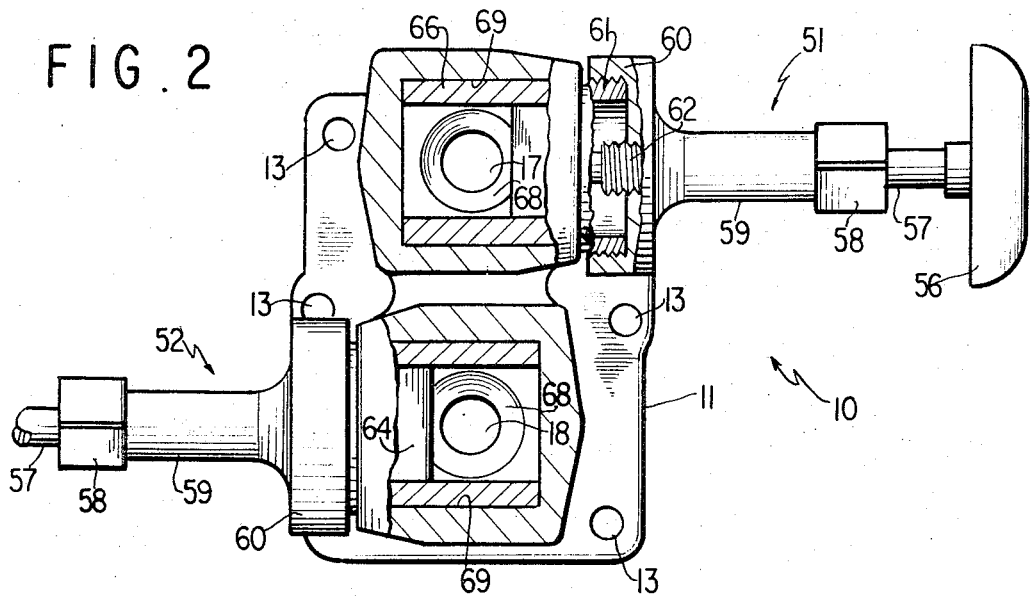
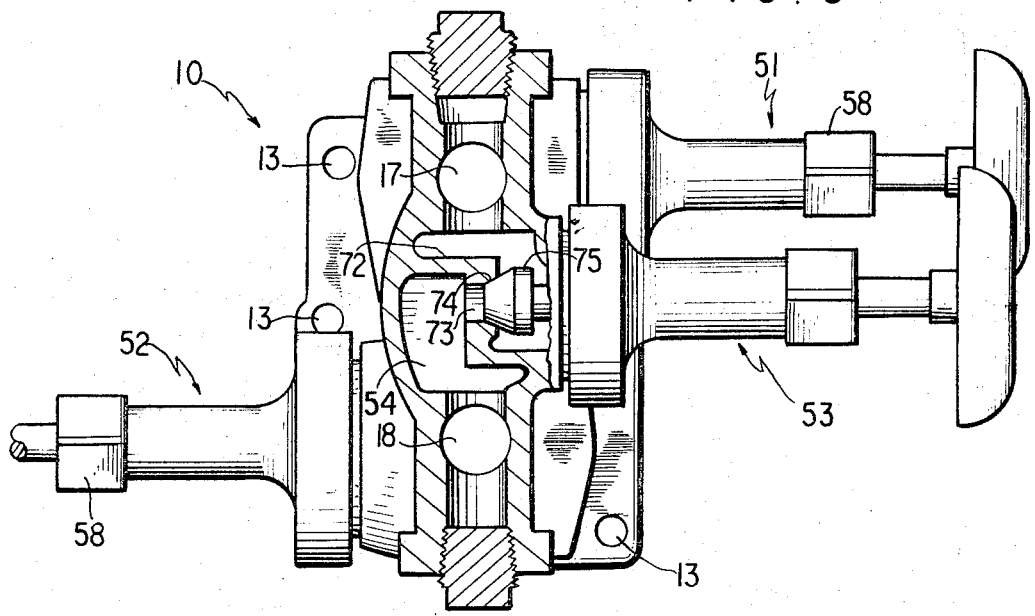
INVENTOR
HOWARD W. KEIL
BY
Robertson, Smythe, Bryan & Parmelee
ATTORNEYS

United States Patent Office 3,351,281
Patented Nov. 7, 1967

3,351,281
UNITARY STEAM TRAP RIG
Howard W. Keil, 26 Steamboat Road,
Great Neck, N.Y. 11024
Filed Aug. 2, 1965, Ser. No. 476,531
3 Claims. (Cl. 236—56)

ABSTRACT OF THE DISCLOSURE

A unitary steam trap rig adapted to be installed in a steam piping system between a steam line and/or a steam condensing device and a condensate return line is provided which includes in one standardized unit a strainer, a trap chamber and associated elements receiving the output from the strainer, inlet and outlet shut-off valves, and a by-pass valve, thus permitting rapid installation at the site with consequent reduction in weight, and bulk and economy of labor and materials, and adapted for ease of maintenance. The casing is assembled from component parts adapted to be disassembled to provide access to strainer and trap chamber for service or replacement.

Description

The present invention relates to a unitary steam trap rig adapted to be installed in a steam piping system between a steam line and/or a steam condensing device and a condensate return line.

The unitary steam trap rig of the present invention is adapted for use in steam piping systems wherever steam traps are usually installed, for example, at heaters, convectors, heat exchangers, steam coils, steam heated equipment, low points in steam mains, bases of riser pipes, ends of mains, and at steam headers. This unitary rig serves the purpose of selectively removing air and condensed steam for discharging them into a return piping system.

Prior to the present invention the conventional steam trap rig has been assembled at the job site. Such prior on-the-spot assemblies have many weaknesses and undesirable qualities. The prior field-assembled steam trap rigs are subject to leaking at each of the many screwed joints in each such assembly. These prior assemblies have usually been made up in the field at a work bench, requiring expensive field labor, so that the preparation of a trap rig for installation has been a time consuming and costly operation. The conventional prior steam trap rig assembly has been made up of a very large number of components; so it is heavy and bulky. It has been possible in the past for an inexperienced mechanic to assemble the various components improperly so that the operation or maintenance have been impaired.

Among the advantages of the unitary steam trap rig of the present invention are those resulting from the fact that it overcomes many, if not all, of the weaknesses and problems of the conventional steam trap rig assembled in the field. The illustrative embodiment of the present invention provides the following numerous advantages:

The unitary steam trap rig has all of its components incorporated in a single casing, thereby eliminating almost all screw joints and the possible leak inherent in all screw connections. Also, it requires no field labor to assemble so that conservation of labor and resulting economy are obtained, permitting more rapid installation at the site. It provides a considerable reduction in weight, which results in a further economy in the over-all structure of the building. Moreover, traps are very often required to be installed in locations where space is a factor and is at a premium. This unitary rig is considerably less bulky than a conventional field assembly, and by being manufactured with all parts in correct relation to one another, it eliminates possible field errors of assembly on the part of inexperienced mechanics.

Another advantage of the illustrative embodiment of the invention results from the fact that the strainer chamber and the trap chamber are immediately adjacent one to another, eliminating the presence and possibility of rust or pipe joint compound occurring between the trap and strainer as happens in the conventional field assembled trap rigs and causes clogging of the trap orifices.

This unitary steam trap rig, by being a standardized unit facilitates maintenance of the equipment, because the mechanics readily become familiar with the convenient arrangement and proper care of the assembly, since it is identical at each location. The typical field assembled steam trap rig must be carefully examined by the maintenance forces since each is piped at the whim of the installer, often one very differently from another.

In addition, this unitary steam trap rig assures control over all of the materials used in all of its component parts so as to minimize electrolytic corrosion. The conventional field assembly usually includes steel and cast iron pipe fittings with valves of brass.

It is an object of the present invention to provide a unitary steam trap rig having advantages over the apparatus of the prior art.

In this specification and in the accompanying drawings, are described and shown a unitary steam trap rig embodying the invention and various modifications thereof are indicated, but it is to be understood that these are not intended to be exhaustive nor limiting of the invention, but on the contrary are given for purposes of illustration in order that others skilled in the art may fully understand the invention and the manner of applying the apparatus in practice as may be best suited to the conditions of a particular use.

Further objects, aspects and features of the present invention will be understood from a consideration of the following detailed description of a unitary steam trap rig embodying the invention when considered in conjunction with the accompanying drawings, in which:

FIGURE 1 is a longitudinal sectional view of the unit;

FIGURE 2 is a sectional view taken on the plane 2—2 of FIGURE 1 passing through the inlet and outlet gate valves;

FIGURE 3 is a sectional view on the plane 3—3 of FIGURE 1 through the by-pass globe valve.

Referring to the drawings in greater detail, the casing of the unitary steam trap rig 10 includes two parts, a larger integral casting 11 and a small end cover casting 12 which is removably secured to the main casting 11 by means of bolts 13 (FIG. 2), with a gasket 14 therebetween. The main casting 11 has a pair of passageways extending therethrough in spaced and generally parallel relationship from its first end 15 to its second end 16.

One of these passageways proceeds substantially straight through the casting 11 and forms the steam inlet passage 17. The other passageway comprises several component portions including a condensate outlet passage 18, a trap chamber 19 and threaded ports 20 and 21 passing through a wall portion 22 and providing communication between the trap chamber 19 and the outlet passage 18.

During manufacture of this unitary rig 10, float valve means 24 are positioned in the trap chamber 19 and assembled with the lower threaded port 20. As shown, the float valve means include an orifice plug 25 screwed into the lowest port 20 and having a float arm 26 hinged at 27 to this plug. A float 28 on the end of the arm 26 rises and falls with the level of water in the trap chamber 19, and controls a valve element 29 which seats against the end of the orifice 30. A thermostatic valve 32 is screwed into the upper port 21, and it includes a temperature-responsive member 33 carrying a pointed valve element which seats against the end of the orifice 34. When steam enters the trap chamber 19 this temperature-responsive member 33 expands so that the pointed valve element seats against and closes the orifice 34. When air enters the trap chamber 19, the member 33 is contracted in the position as shown so that the orifice 34 is uncovered for permitting the discharge of the air into the return passage 18.

As a modification for use in installations where the removal of air is not required, the thermostatic valve means 32 may be omitted and a plug is screwed into the threaded port 21 to close it off completely.

The outer end of the trap chamber has a large access opening 35 for enabling insertion of the float valve means 24 and the thermostatic valve means 32.

The end casting 12 has passage 36 aligned with and forming an extension of the steam inlet passage 17. This inlet steam passage communicates through a port 37 with the interior of a cylindrical strainer 38. The upper end of this strainer seats around the port 37, and it is held in place by a retainer 40 having a clean-out plug 41 mounted therein. The retainer 40 has a socket 42 for receiving the lower end of the strainer which forms a pocket for collecting and holding dirt. Any collected dirt may be removed from time-to-time by unscrewing the clean-out plug 41. This strainer 38 serves to collect rust flakes, scale or other solids which might clog the orifices of the trap were they not prevented from reaching the chamber 19. To remove the strainer for overhaul or replacement, a wrench is applied to a hexagonal boss 44 for unscrewing the retainer 40.

In order to permit repair of the trap or cleaning of the strainer without shutting down the steam service during such maintenance, the main casting 11 includes two shut-off valves 51 and 52 and a by-pass valve 53. The shut-off valve 51 is shown as a gate valve which serves to close the steam inlet line 17. Similarly, the shut-off valve 52 is of the gate type for closing the condensate outlet line 18, while the by-pass valve 53 is illustratively shown as a globe-type valve for shutting off a by-pass channel 54 which is adjacent to the casting end 15 for interconnecting the passages 17 and 18.

The two shut-off valves 51 and 52 are identical and each include a bonnet assembly including a handwheel 56, a stem 57, a packing nut 58 and a bonnet sleeve 59. This bonnet sleeve is removably secured to the casting 11 by an internally threaded base portion 60 which is screwed onto a threaded boss 61 on the casting 11. The stem 57 includes a screw shank 62 for controlling a gate 64 sliding within a valve body 66. This valve body includes a pair of guides 67 engaging in grooves on opposite edges of the gate and has opposed seats 68 which converge slightly so that the gate 64 wedges tightly between these seats when it is closed.

In order to enable complete removal of the respective valve 51 or 52 for inspection or replacement, the casting 11 is formed with a large cylindrical recess 69 which extends perpendicular to and intersects squarely with the inlet passage 17, or outlet passage 18, as shown in FIGURES 1 and 2 for the respective valves 51 and 52. The valve body 66 has a cylindrical contour so that it fits snugly into the recess 69. When the bonnet base 60 is unscrewed from the boss 61, then the whole valve body 66 can be removed together with the gate 64 for inspection, servicing or replacement. In FIGURE 2 both of the valves 51 and 52 are shown in their wide open positions.

As shown in FIGURE 3 the by-pass channel 54 includes a partition 72 containing a port 73 surrounded by a seat ring 74. When the by-pass valve 53 is in closed position, its disc 75 seats down into the ring 74 so as to close off the flow from the passage 17 through the channel 54 to the passage 18. If it is desired to inspect the seat ring 74 or to service the valve 53, then it is possible to remove the whole valve 53 by unscrewing its bonnet base 76 from a threaded boss on the casting 11.

When this steam trap unit is installed, a pipe connection 78 from the steam line is screwed into a threaded inlet 79 in the casing end 15. Alternatively, if it is more convenient for the installer, a plug 80 is removed from a side inlet 81 so that the connection 78 can enter at 81, in which case the inlet 79 is plugged. Similarly, an outlet pipe connection 82 is made to the return piping of the system, this connection being made at the end outlet 84 or alternatively at the side outlet 85 having a removable plug 86.

A removable drain plug 88 is shown screwed into a drain port 89 at the bottom of the trap chamber 19 for use in flushing out the trap chamber if desired.

It will be appreciated that the end casting 12 may be removed by unscrewing the attachment screws 13 so as to provide access to the interior of the trap chamber 19 and to the components therein. There is a clearance space 90 completely surrounding the strainer 38, thus making substantially all of the strainer surface effective for minimizing any clogging effects of dirt lodged against some portions of the interior of this strainer.

In operation air is allowed to discharge through the orifice 34 into the return line 82 until steam enters the trap chamber 19. The resulting rise in temperature causes the thermostatic valve to seat as explained further above. Any substantial amount of condensed steam in the chamber 19 causes the float 28 to rise as explained further above so that the water is discharged through the orifice 30.

In summary, it will be appreciated that this unitary steam trap rig is very convenient to service and is compact, for it defines within itself a generally U-shaped flow path. This flow path progresses from the steam inlet at the first casing end 15 over to the second end 16 and then down as indicated by the arrows 90 and 91 through the end cover casting and back through the strainer and trap chamber into the condensate outlet passage, which emerges from the first end of the casing.

From the foregoing it will be understood that the unitary steam trap rig of the present invention described is well suited to provide the advantages set forth, and since various possible changes may be made of the various parts of this invention, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention as claimed hereinafter.

What is claimed is:

1. A unitary steam trap rig adapted for connection between a steam line and a condensate return line comprising a casing having a steam inlet passage and a condensate outlet passage entering and exiting, respectively, from the same end of the casing, said casing defining a generally U-shaped flow path therein extending from said inlet to said outlet, said casing having a strainer chamber therein at the opposite end from said inlet and outlet and including strainer means connected to said inlet passage, said casing having a trap chamber for receiving the output from said strainer chamber, said trap chamber including float means therein, float valve means defining an exit from said trap chamber for feeding condensate into said condensate outlet passage, said float valve means being controlled by said float means, an inlet shut-off valve in said inlet passage before said strainer chamber, an outlet shut-off valve in said outlet passage after said float valve means, said casing having a by-pass channel therein from said inlet passage to said condensate outlet passage, and valve means for closing said by-pass channel.

2. A unitary steam trap rig comprising a casing having a steam inlet passage and a condensate outlet passage in spaced parallel relationship, said passages entering and exiting respectively from the same first end of the casing, a by-pass channel interconnecting said passages near said first end, a by-pass valve for controlling flow through said channel, said casing having a strainer chamber extending transversely across its second end and having inlet and outlet ports, said inlet passage communicating with said inlet port, said strainer chamber having a strainer seat surrounding said inlet port, means for holding a strainer in said chamber engaged with said seat, said casing having a trap chamber communicating with the outlet from said strainer, float valve means and thermostatic valve means for controlling the flow out of said trap chamber into said outlet passage, and shut-off valve means in each of said passages.

3. A unitary steam trap rig adapted for connection to a condensate return line in a steam system comprising a casing having a first and a second end, said casing including an inlet passage for connection to the steam system and an outlet passage for connection to the condensate return line, said inlet and outlet passages being in spaced relationship in said casing and entering and exiting respectively from the first end of the casing, said casing having a plurality of parts, one of said parts forming said second end of the casing and having a strainer chamber therein communicating with said inlet passage when said parts are assembled, another of said parts having a trap chamber therein communicating with said outlet passage, said strainer chamber being adjacent to and opening into said trap chamber when said parts are assembled, means for removably securing said parts together for providing access simultaneously to the interior of said strainer and trap chamber when said parts are disassembled, a pair of shut-off valves for shutting off the inlet passage and the outlet passage, respectively, and a by-pass valve connected between said inlet and outlet passages near the first end of said casing for by-passing both of said shut-off valves and said strainer and trap chambers.

References Cited

UNITED STATES PATENTS

| | | | |
|---|---|---|---|
| 1,032,787 | 7/1912 | Singer | 137—192 |
| 1,566,238 | 12/1925 | Swendeman | 137—192 |
| 1,840,441 | 1/1932 | Fina | 137—192 |
| 2,117,056 | 5/1938 | Dunn | 137—192 |
| 2,895,496 | 7/1959 | Sanctuary | 137—599 X |
| 3,071,342 | 1/1963 | Allen | 251—328 X |

FOREIGN PATENTS 141,760   5/1935   Austria.

ALAN COHAN, *Primary Examiner.*